May 11, 1926.
W. W. LINK
SHEARS
Filed April 23, 1923
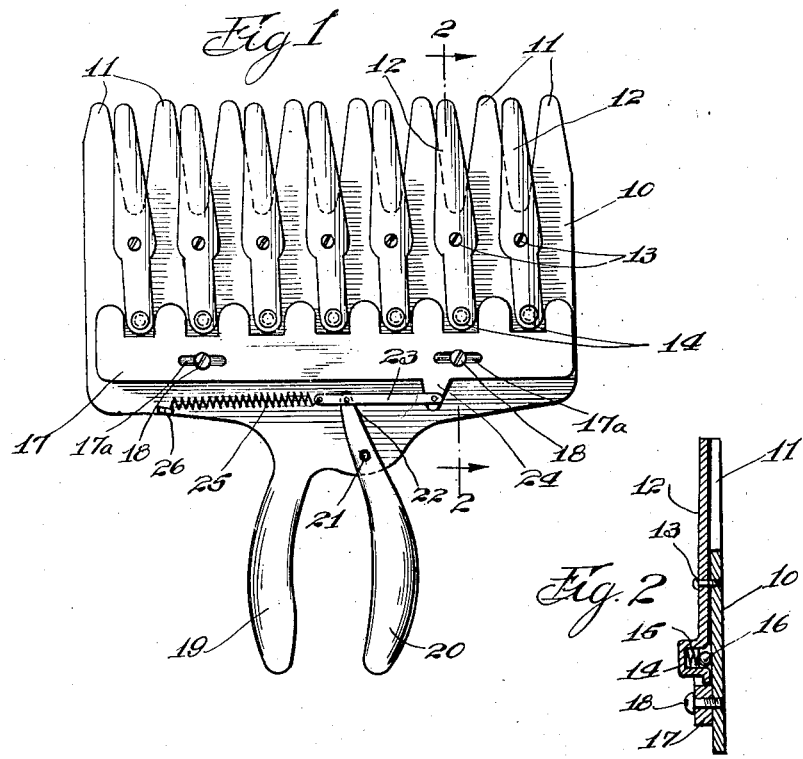
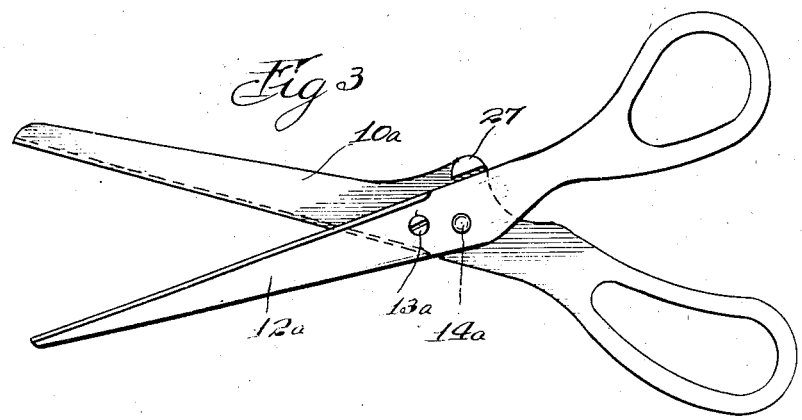
INVENTOR.
William W. Link.
BY Albert C. Bell
ATTORNEY.

Patented May 11, 1926.

1,584,459

UNITED STATES PATENT OFFICE.

WILLIAM W. LINK, OF CHICAGO, ILLINOIS.

SHEARS.

Application filed April 23, 1923. Serial No. 633,886.

My invention relates to an improved form of shears particularly adapted to that type of shear construction in which a plurality of successive cutting edges is employed of the general type illustrated in well known hair clipper constructions and while I have shown my invention embodied in a small portable hand operated device adapted for trimming lawns and other purposes of like nature for which a hand operated shear of this class may be used, I do not limit myself to this particular embodiment since the novel shear construction disclosed may be employed for any purpose for which a shear or clipper having a plurality of cutting edges may be employed. It will be observed that my construction is of the same general type as the cutting mechanism of a mowing machine used for agriculture purposes in which one member of the shearing mechanism is a flat plate provided with adjacent teeth having cutting edges and provided with movable cutting edges for engaging the cutting edges of the teeth.

My invention consists essentially in providing a separate movable shear blade for each tooth of the notched shear plate, providing the shear blade with a pivotal support permitting the pivotal portion of the blade to occupy a position slightly removed from the adjacent surface of the shear plate, and providing the shear blade with spring mechanism holding the pivotal portion of the blade away from the shear plate in a manner to press the cutting edges of the shear blade into engagement with the cutting edges of the shear plate, whereby the shear blade may be and is preferably substantially flat on its cutting face, as is also the cutting face of the shear plate and yet the cutting edges of the shear blade and plate engage each other at all times and thus positively cut the blades of grass or other material being cut, instead of the shear blade being in flat engagement with the shear plate for which condition the articles or material being cut would tend to lift and spring the shear blades and so avoid cutting the material. In carrying out my invention I preferably provide a socket in the flat surface of the shear blade on the end portion thereof opposite to the cutting end of the blade and in the socket I dispose a spring and ball, the spring serving the purpose above described and the ball providing an anti-friction bearing between the socket end of the shear blade and the shear plate. By my invention I also provide a common actuating mechanism for all of the shear blades so that they are simultaneously operated by reciprocation of the operating mechanism. My invention is also applicable to ordinary hand shears having a single pair of blades, as will more fully appear below.

My invention will best be understood by reference to the accompanying drawings illustrating a preferred embodiment thereof in which—

Fig. 1 shows in plan view a construction of shear with a plurality of cutting edges designed for hand operation, Fig. 2 is a sectional view of the parts shown in Fig. 1 taken along the line 2—2, and Fig. 3 shows in a view similar to Fig. 1 a shear construction having a single pair of cutting blades provided with my improved construction.

Similar numerals refer to similar parts throughout the several views.

As shown in Fig. 1 my shear consists of a shear plate 10 provided with a plurality of teeth 11, each of which has a cutting edge on each side thereof. The plate 10 is preferably flat and supports a plurality of shear blades 12 in line with the centers of the notches between the teeth 11, said shear blades being pivotally connected to the plate 10 by pivot screws 13 threaded into the plate 10 and of a length such that when the screws tightly engage the plate 10, a slight clearance is left between the cutting face of each shear blade and the cutting face of the plate 10. The cutting face of each of the shear blades is substantially flat and each shear blade is extended beyond its pivotal portion and is provided on its end opposite the cutting end with a socket 14 extending away from the plate 10. As more clearly shown in Fig. 2, each socket 14 contains a spring 15 and a ball 16, the ball being between the spring and the shear plate 10, as a result of which the spring moves the shear blade as far as the pivot screw 13 will permit away from the shear plate 10, at the same time pressing the cutting edges of the shear blade, which are the edge portions of the blade adjacent the cutting edges on the teeth 11, firmly into engagement with the cutting edges on the teeth 11, the tension of the springs 15 being sufficient to hold the cutting edges firmly in engagement with each other to prevent the material being cut from lifting the shear blade away from the shear plate instead of cutting said material. It will be understood that the tension of the springs 15 depends upon the material to be cut and that this tension is preferably greater in proportion as the material to be cut is difficult to cut by shearing action. That is to say, a shear constructed for cutting one class of material will have springs of one tension while a shear designed for cutting another class of material will preferably have springs of another tension.

The socket ends of the shear blades are preferably rounded as indicated to be engaged by notches formed therefor in an operating plate 17, secured to the shear plate 10 by means of guide screws 18 extending through suitable slots 17ª therefor in the operating plate, the adjustment of the screws 18 being such so to permit free sliding movement of the operating plate 17 on the shear plate 10 and at the same time holding the operating plate 17 positively in engagement with the socket ends of the shear blades 12. The slots 17ª are preferably of a length limiting the reciprocating motion of the operating plate 17 so that in one extreme position the cutting ends of the shear blades overlap the teeth 11 and in the other extreme position of the operating plate 17, the shearing end of each blade 12 is moved to overlap the next tooth 11 in the direction of motion of the shearing end of the blade 12.

In the embodiment shown in Figs. 1 and 2 of the drawings, provision is made for operating the shear by hand, thus adapting it for any use for which a hand shear may be employed for example trimming lawns or cutting grass wherever it may be desired, clipping hair, etc. I do not however limit myself to the particular proportions of shear illustrated, as it may be constructed in any size desired and it may furthermore be operated in any manner that is convenient and by means of any desired power, depending upon the construction of the shear and the purpose for which it is designed. As shown in the drawings the shear plate 10 is extended beyond the operating plate 17 to form a first and stationary handle 19 and a second movable handle 20 is pivotally connected at 21 with the plate 10 by means of a suitable pivot screw or stud, said handle 20 being extended beyond its pivotal portion and pivotally connected at 22 with a link 23, one end of which is pivotally connected with a lug 24 extending from the operating plate 17, the other end of said link being connected with one end of a spring 25 the other end of which engages a lug 26 extending from the shear plate 10. The spring 25 is of sufficient tension to positively move the shear blades 12 in one direction and effect the cutting operation in that direction, which direction of motion moves the handle 20 away from the handle 19. The other direction of motion of the shear blades is effected by pressing the handle 20 towards the handle 19 and thus a convenient means of operation by hand is afforded.

A marked advantage secured by the construction above described is that each shear blade, as far as its cutting action is concerned, is independent of the other shear blades and is also not restrained in any manner by the operating plate, in other words each shear blade is free to respond at all times to the action of its spring 15 and thus its cutting edges are held firmly in engagement with the corresponding cutting edges of the teeth 11 at all times and in this manner the difficulty of accurately adjusting all of the shear blades so that they have exactly the same relation to the cutting edges on the teeth 11, as would be required if the shear blades were rigidly connected together or a part of the same cutting member, is avoided. This construction furthermore takes care of any inequalities in wear between different shear blades so that the spring 15 of each shear blade automatically follows up any condition of wear for that shear blade and at all times holds the cutting edges firmly in engagement with each other independently of the corresponding requirements of any other shear blade and thus all of the shear blades are maintained at all times in proper cutting relation to the shear plate. In this manner accurate grinding is eliminated and the device may be constructed at correspondingly less expense than is the case where the cutting edges can only be placed in proper relation to each other by accurate and costly grinding operations.

In Fig. 3 I show an ordinary shear construction of the type well known for household use, consisting of a pair of shear blades 10ª and 12ª pivotally connected by a screw 13ª, the cutting faces of the blades being preferably substantially flat and the pivot screw 13ª being proportioned substantially as above described for the pivot screw 13 so that a sufficient clearance between the cutting faces of the blades may be had at their pivotal portions to insure bringing the cutting edges of the blades together. The blade 12ª is provided with a socket 14ª similar to each of the sockets 14 above described and provided with a spring and ball similar to the springs 15 and balls 16 above described and for the same purpose. As a result of this construction the blade 12ª is tilted on the pivot screw 13ª to bring its cutting edge into engagement with the cutting edge of the blade 10ª in the same manner above described for the shear plate 10 and shear blades 12. The blade 10ª is preferably provided with a stop 27 to prevent opening the shear blades far enough to move the socket 14ª beyond the outer edge of the shear blade 10ª, thus insuring that the socket 14ª shall be over the shear blade 10ª at all times.

While I have shown my invention in the particular embodiments above described, it will be understood that I do not limit myself to these exact constructions as I may employ equivalents known to the art at the time of the filing of this application without departing from the scope of the appended claims.

What I claim is:

1. In a shear, the combination of a plate having a plurality of projecting teeth provided with cutting edges, a shear blade mounted on said plate in line with each notch between a pair of said teeth, a pivotal connection between each blade and said plate, spring means holding the pivotal portion of each blade away from said plate and the cutting portion of said blade in engagement with the cutting edges on adjacent teeth, and a common actuating mechanism loosely engaging all of said blades to operate them, each of said blades being extended from its pivotal portion away from its cutting portion, and said actuating mechanism comprising a notched reciprocable plate containing said extended ends in its notches.

2. In a shear, the combination of a plate having a plurality of projecting teeth provided with cutting edges, a shear blade mounted on said plate in line with each notch between a pair of said teeth, a pivotal connection between each blade and said plate, spring means holding the pivotal portion of each blade away from said plate and the cutting portion of said blade in engagement with the cutting edges on adjacent teeth, and a common actuating mechanism loosely engaging all of said blades to operate them, each of said blades being extended from its pivotal portion away from its cutting portion, and said spring means comprising a compression spring and a ball for each blade, each of said extended ends having a socket containing one of said springs and one of said balls between said blade and said plate, and said actuating mechanism comprising a notched reciprocable plate containing said extended ends in its notches.

3. In a shear, the combination of a plate having a plurality of projecting teeth provided with cutting edges, a shear blade mounted on said plate in line with each notch between a pair of said teeth, a pivotal connection between each blade and said plate, spring means holding the pivotal portion of each blade away from said plate and the cutting portion of said blade in engagement with the cutting edges on adjacent teeth, and a common actuating mechanism loosely engaging all of said blades to operate them, said pivotal connection comprising a headed stud permitting a separation of the pivotal portion of the blade from said plate, and said spring means comprising a compression spring and a ball for each blade, each of said extended ends having a socket containing one of said springs and one of said balls between said blade and said plate, and said actuating mechanism comprising a notched reciprocable plate containing said extended ends in its notches.

In witness whereof, I hereunto subscribe my name this 20th day of April, A. D. 1923.

WILLIAM W. LINK.